United States Patent
Eguchi

[11] Patent Number: 5,833,248
[45] Date of Patent: Nov. 10, 1998

[54] STAIRWAY ASCENDING/DESCENDING VEHICLE HAVING AN ARM MEMBER WITH A TORQUE TRANSMITTING CONFIGURATION

[75] Inventor: Yasuhiko Eguchi, Neyagawa, Japan

[73] Assignee: EXEDY Corporation, Neyagawa, Japan

[21] Appl. No.: 858,709

[22] Filed: May 9, 1997

[30] Foreign Application Priority Data

May 23, 1996 [JP] Japan .................................. 8-128149

[51] Int. Cl.⁶ ...................................................... B62B 5/02
[52] U.S. Cl. ............................................ 280/5.28; 180/8.3
[58] Field of Search ................................... 280/5.2, 5.28, 280/28.5; 180/7.1, 8.2, 8.3; 305/1, 3

[56] References Cited

U.S. PATENT DOCUMENTS

| | | | |
|---|---|---|---|
| 1,887,427 | 11/1932 | Porcello | 280/5.28 |
| 3,299,978 | 1/1967 | Sponsler | 180/9.52 |
| 4,569,409 | 2/1986 | Kluth | 280/5.28 |
| 4,993,912 | 2/1991 | King | 280/5.28 |

*Primary Examiner*—Robert J. Oberleitner
*Assistant Examiner*—C. J. Bartz
*Attorney, Agent, or Firm*—Shinjyu An Intellectual Property Firm

[57] ABSTRACT

A stairway ascending/descending vehicle which may ascend/descend the steps of the stairs having a height greater than a diameter of wheels and in which vertical vibration is suppressed. The stairway ascending/descending vehicle has main shafts rotatably supported on a front portion and a rear portion of a vehicle body, respectively. Front arm members 4L and 4R are mounted to the front main shafts, and rear arm members 5L and 5R are mounted to the rear main shaft, the front and rear arm members are configured to rotate with respect to the main shafts. Front wheels 6a and 6b are mounted on the front arm members and rear wheels 7a and 7b are to the rear arm members. Torque transmitted from each of the main shafts is transmitted through a first gear 12 connected to the main shafts to second gears 13a and 13b and third gears 14a and 14b to the wheels, the gears 12, 13a, 13b, 14a and 14b all being supported within the arm members, the gears 14a and 14b being connected to the wheels. The gear ratio defined by the gears 12, 13a, 13b, 14a and 14b determine whether the vehicle body 1 climbs a stairway in either a crawling mode or a rotational mode.

4 Claims, 9 Drawing Sheets

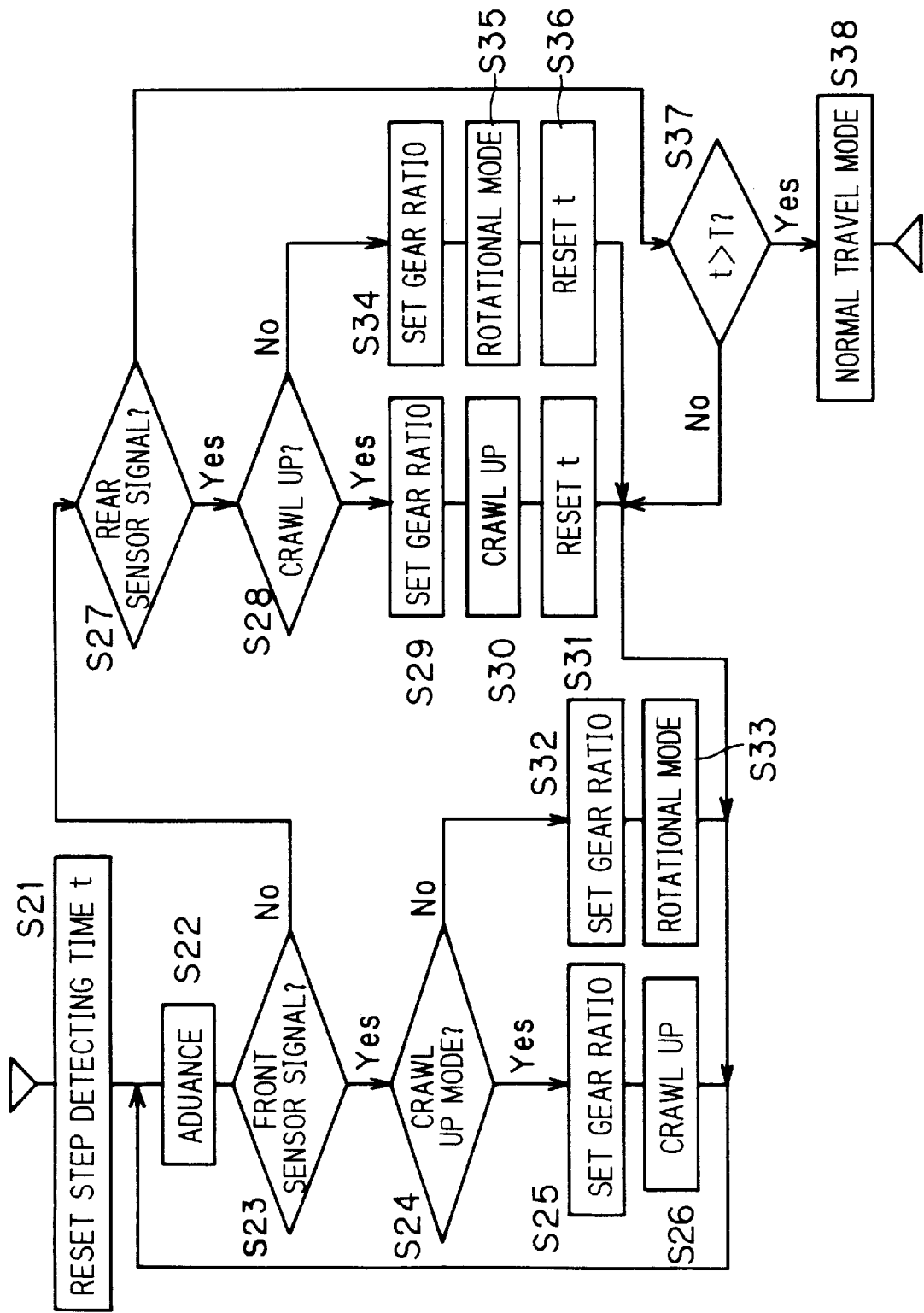

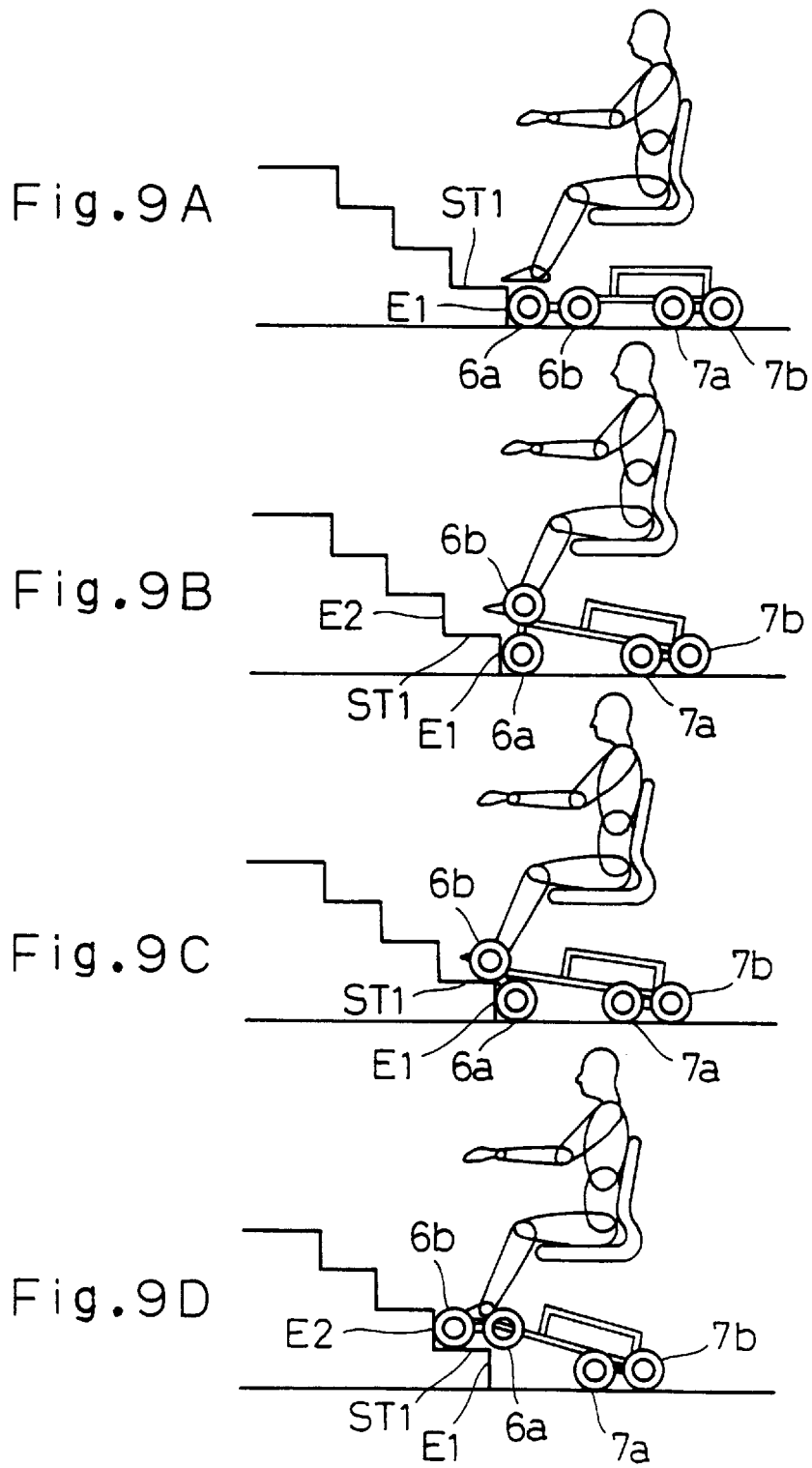

5,833,248

STAIRWAY ASCENDING/DESCENDING VEHICLE HAVING AN ARM MEMBER WITH A TORQUE TRANSMITTING CONFIGURATION

BACKGROUND OF THE INVENTION

A. Field of the Invention

The present invention relates to a stairway ascending/descending vehicle for ascending and/or descending a flight of stairs.

B. Related Art

A stairway ascending/descending vehicle, i.e, a so called "crawler" type vehicle has been proposed which includes a plurality of wheels on a lower portion of a vehicle body. A belt is arranged around these wheels, hook claws or the like are provided on an outer surface of the belt. The belt is circulated around the wheels to thereby descend and ascend a stairway.

Another stairway ascending/descending vehicle has been proposed in which rotary members are rotatably mounted on the vehicle body, and a plurality of wheels are mounted on the rotary members eccentric to the rotary shafts of the rotary members. In this stairway ascending/descending vehicle, the rotary members are rotated about the wheels located in the front side so that the other wheels are moved to the next step surface. This operation is repeated so that the vehicle may ascend/descend the stairway.

In the crawler type stairway ascending/descending vehicle, since the hook claws are hooked at the corner portions of the step surfaces of the stairs to ascend/descend the stairway, the step surfaces of the stairs may become damaged. In the stairway ascending/descending vehicle that ascends/descends the stairway while rotating a plurality of wheels, it is possible to prevent damage to the step surfaces of the stairs. However, since the height of each step of the staircase that the vehicle may ascend or descend is limited according to the size of the rotary members or the wheels, it is necessary to provide sufficiently large wheels or rotary members. This leads to an increase in the size of the vehicle, which makes it difficult to reduce its weight and limits design options. Also, since the vehicle body is moved up and down in accordance with the rotation of the rotary members, the ride is both uncomfortable and unstable.

SUMMARY OF THE INVENTION

An object of the present invention is to provide a stairway ascending/descending vehicle which can ascend and descend a stairway even if the height of each step of the stairway exceeds the diameter of its wheels, and which has excellent stability without vertical vibration.

In accordance with one aspect of the present invention, a stairway ascending/descending vehicle for ascending/descending a flight of stairs includes a vehicle body and front and rear main shafts rotatably supported on a front portion and a rear portion of the vehicle body, respectively. There are front and rear arm members rotatably supported on right and left side portions of the main shafts, respectively, each of the front and rear arm members configured to rotate relative to a corresponding one of the main shafts. Each of the front and rear arm members include two wheels rotatably mounted on opposite ends of the arm members, each of the front and rear arm members further including torque transmitting members for transmitting torque from the main shafts to the wheels. Further, there is a torque generating means for powering the main shafts.

Preferably, each of the torque transmitting members include a plurality of gears mechanically connecting the main shafts and the wheels within a corresponding one of the arm members.

Preferably, the plurality of gears include:

a first gear fixed to the corresponding one of the main shafts within a corresponding one of the arm members;

a pair of second gears, each second gear disposed on opposing lateral sides of the first gear within the arm member, each of the second gears meshed with the first gear for counter-rotation therewith;

a pair of third gears, each of the third gears disposed within the arm member and attached to a corresponding one of the wheels, each of the third gears meshed with a corresponding one of the second gears; and the first, second and third gears being configured to define a predetermined gear ratio between the first gear and the third gears.

Preferably, the predetermined gear ratio between the first gear and the third gears is such that in response to one of the wheels engaging a vertical surface the corresponding one of the arm members rotates in a direction corresponding to the rotational direction of the main shafts.

Preferably, the predetermined gear ratio between the first gear and the third gears is such that in response to one of the wheels engaging a vertical surface the corresponding one of the arm members rotates in a direction opposite to the rotational direction of the main shafts.

Alternatively, the torque transmitting members includes:

a first gear fixed to the corresponding one of the main shafts within a corresponding one of the arm members;

a pair of gear ratio changing mechanisms disposed on opposing lateral sides of the first gear within the arm member, each of the gear ratio changing mechanisms engaged with the first gear;

a pair of third gears, each of the third gears disposed within the arm member and attached to a corresponding one of the wheels, each of the third gears engaged with a corresponding one of the gear ratio changing mechanisms; and the gear ratio changing mechanisms being configured selectively change a gear ratio between the first gear and the third gears.

In accordance with another aspect of the present invention, there is a method for controlling a vehicle ascending and descending a flight of stairs, comprising the steps of:

controlling rotation of a plurality of wheels, two of the wheels being attached to an elongated arm member, the arm member being supported on a rotatable shaft which is turn supported on a vehicle body having a plurality of the rotatable shafts supported thereon, the arm member being rotatable with respect to the rotatable shaft and the wheels being rotatable with respect to the arm member, and torque transmitting members being employed within the arm member for transmitting torque to the wheels;

sensing proximity to a step of a stairway from sensors installed on the vehicle body;

determining one of two modes for ascending the stairs in response to signals from the sensors and configuration of the arm members, the modes being either a crawling mode where the arm member pivots about the main shaft as the vehicle body climbs the stairs or a rotational mode where the arm member rotates about the main shaft as the vehicle body climbs the stairs;

engaging the stairs in the determined mode; and sensing proximity to another step of the stairway.

With the present invention, the gear ratio relating to the output of the main shafts verses the rotation of the wheels may be varied. For instance, in one configuration, the ratio may be set so that the arm members pivot in response to engagement with a set of stairs causing the vehicle body to engage a set of stairs in a Crawling mode where all of the wheels keep a generally constant engagement with the surfaces of the stairs and the stair risers (vertical faces or edges of the stair step). In another configuration, the ratio may be set so that the arm members rotate about the main shafts in response to engagement with stair steps in a Rotational mode. The ratio may be permanently fixed within the arm members by using fixed gears, or gears may be used in combination with a gear ratio changing mechanism so that the vehicle body can engage a set of stairs in either the Crawling mode or the Rotation mode.

BRIEF DESCRIPTION OF THE DRAWINGS

FIG. 6 is another control flowchart for the vehicle depicted in FIG. 1;

FIGS. 9A to 9D show the vehicle depicted in FIG. 1 ascending a flight of stairs in a rotational mode.

DESCRIPTION OF THE PREFERRED EMBODIMENTS

A stairway ascending/descending vehicle according to the present invention will now be described with reference to the accompanying drawings.

Figure 1:
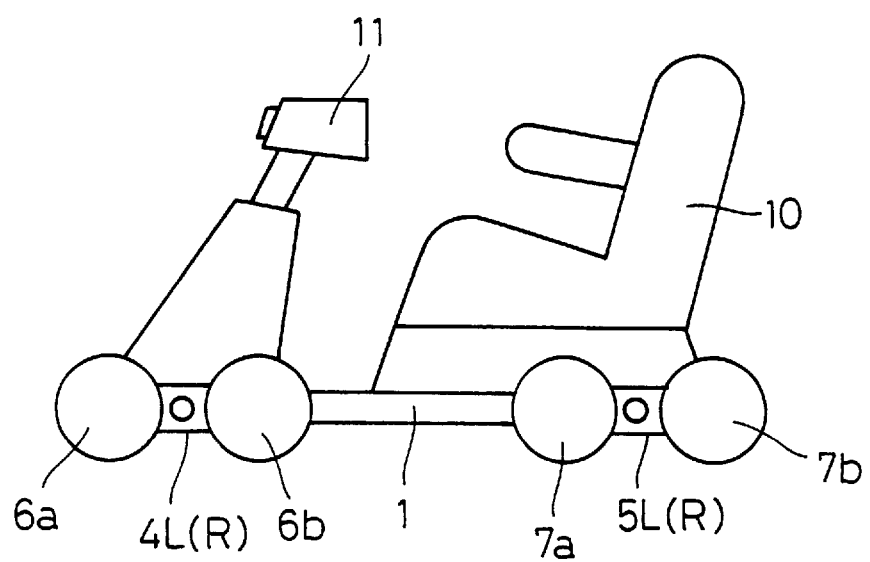
FIG. 1 is a side elevational view showing a stairway ascending/descending vehicle according to one embodiment of the present invention.
Figure 2:
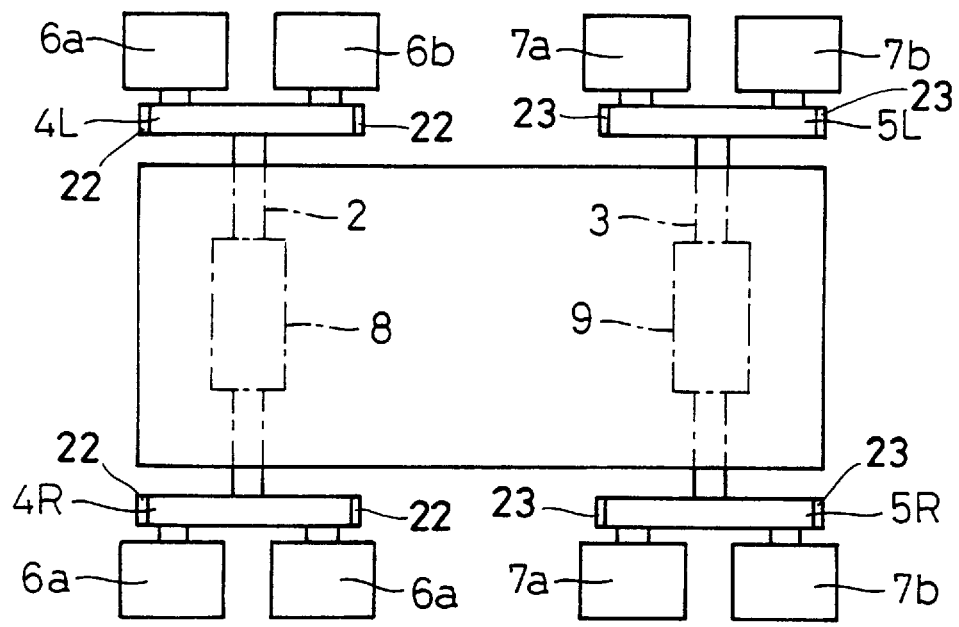
FIG. 2 is a schematic bottom view of the stairway ascending/descending vehicle depicted in FIG. 1, showing a bottom surface of the vehicle, the vehicle having four arm members.

FIG. 1 shows a stairway ascending/descending vehicle which includes a front main shaft 2 and a rear main shaft 3 rotatably supported on the front and rear portions of a vehicle body 1, front arm members 4R and 4L rotatably supported on the right and left sides of the front main shaft 2, and rear arm members 5R and 5L rotatably supported on the right and left sides of the rear main shaft 3. As shown in FIG. 2, the front arm members 4R and 4L pivot on the front main shaft 2, and front wheels 6a and 6b are mounted on opposing ends of the front arm members 4R and 4L in the lengthwise direction. The rear arm members 5R and 5L pivot on rear main shaft 3, and rear wheels 7a and 7b are mounted on opposing ends of the rear arm members 5R and 5L in the lengthwise direction. As may be ascertained from FIG. 1, the front of the vehicle body 1 is on left side of FIG. 1 and the rear of the vehicle body 1 is on the right side of FIG. 1.

The front wheels 6a and 6b are connected to the front shaft 2 through a plurality of gears mounted within the front arm members 4R and 4L. The rear wheels 7a and 7b are connected to the rear shaft 3 through a plurality of gears mounted within the rear arm members 5R and 5L.

The front main shaft 2 and the rear main shaft 3 can be driven in the forward and reverse directions by a front wheel drive motor 8 and a rear wheel drive motor 9 provided within the vehicle body 1. The vehicle body 1 is also provided with a steering mechanism (not shown), which steers the front wheels 6a and 6b.

A seat 10 and an operation panel 11 are provided on an upper portion of the vehicle body 1. The operation panel 11 includes a lever for steering the front wheels 6a and 6b, a main switch, a mode selection switch for switching the travel modes, a lever for controlling the speed of the vehicle, a brake switch, a display portion, and other switches.

Figure 3:
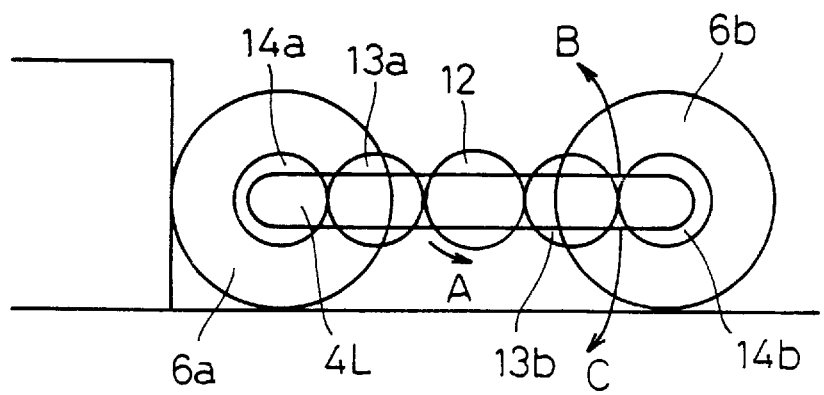
FIG. 3 is a schematic view showing the structure of a differential gear within each of the arm members of the vehicle depicted in FIG. 1.

FIG. 3 shows a set of differential gears for the front arm member 4L mounted on the left side of the front main shaft 2. It should be appreciated that the four arm members 4L, 4R, 5L and 5R are generally the same in configuration and construction. Therefore, the description of the front arm member 4L applies to the other arm members 4R, 5L and 5R, as well.

A first gear 12 is mounted on the front main shaft 2 and rotates together therewith. Second gears 13a and 13b are rotatably supported on the front arm member 4L and mesh with the first gear 12. The second gears 13a and 13b mesh with a third gear 14a fixed to a rotary shaft of the front wheel 6a and a third gear 14b fixed to the rotary shaft of the front wheel 6b, respectively.

The forward motion of the vehicle body 1 is desired (movement toward the left side of FIG. 1), the first gear 12 is rotated in the direction indicated by arrow A in FIG. 3 in response to the rotation of the front main shaft 2. Thus, torque is applied such that the front wheel 6b is rotated. As may indicated in FIG. 3, the torque from the first gear 12 may do one of two things: first, the torque from the first gear 12 may lift the front wheel 6b in a direction indicated by arrow B in FIG. 3; or, the torque from the first gear 12 may cause the front wheel 6b to press against the adjacent surface (i.e. a step on stairs) in a direction indicated by arrow C in FIG. 3) thus causing the front wheel 6a to be lifted off the adjacent surface and move upward toward an adjacent higher stair surface.

The respective gears mounted on the front arm 4L are constructed so that the gear ratio of the first gear 12 to the third gears 14a and 14b (Z3/Z1) may be selected from a variety of ratios, and therefore, the gears may be configured such that, Z3/Z1<1 or Z3/Z1>1, as is explained in greater detail below. The same structure may be used for the front arm member 4R and the rear arm members 5R and 5L.

Regardless of which gear ratio Z3/Z1<1 or Z3/Z1>1 is set in the arm members 4R, 4L, 5R and 5L, the following relationship is true. If the RPM of the first gear 12 in the direction indicated by the arrow A is n1, and the RPM of the arm member 4L in the direction indicated by the arrow B is n2, then: (n1/n2)=1−(Z3/Z1). When the first gear 12 rotates in the direction indicated by arrow A in FIG. 3 together with the main shaft 2, the RPM of the first gear 12 is greater than zero (n1>0). Accordingly, when (1−(Z3/Z1)) is greater than zero, the RPM of the arm member 4L is greater than zero (n2>0). As a result, the arm member 4L is rotated such that the front wheels 6b are lifted off the surface of the step (in the direction indicated by the arrow B). When (1(Z3/Z1))is less than zero, the RPM of the arm member 4L is less than zero (n2<0). As a result, the arm member 4L is rotated such that the front wheels 6b are pressed against the surface of the step (in the direction indicated by the arrow C).

It should be appreciated that the arm members 4L, 4R, 5L and 5R could be provided with a gear ratio changing mechanism, whereby the ratio Z3/Z1 could be selectively changed between being Z3/Z1<1 or Z3/Z1>1. For instance, the second gears 13a and 13b, as shown in FIG. 3, instead of being gears, may optionally be gear ratio changing mechanisms which alter the ratio Z3/Z1.

In some applications of the present application, it may be desirable for the arm members 4L, 4R, 5L and 5R to have a fixed gear ratio Z3/Z1 which is predetermined for a specific application. For instance, movement of the arm members 4L, 4R, 5L and 5R in the direction of the arrow B in FIG. 3 may be desirable where the user regularly goes up and down a set of stairs where movement of arm members 4L, 4R, 5L and 5R in the direction indicated by the arrow B is advantageous to the configuration of the stairs. Further, it may be desirable for the arm members 4L, 4R, 5L and 5R to have a fixed gear ratio Z3/Z1 which allows for movement of the arm members 4L, 4R, 5L and 5R in the direction of the arrow C in FIG. 3 where the user regularly goes up and down a set of stairs where movement of arm members 4L, 4R, 5L and 5R in the direction indicated by the arrow C is advantageous to the configuration of the stairs.

Figure 4:
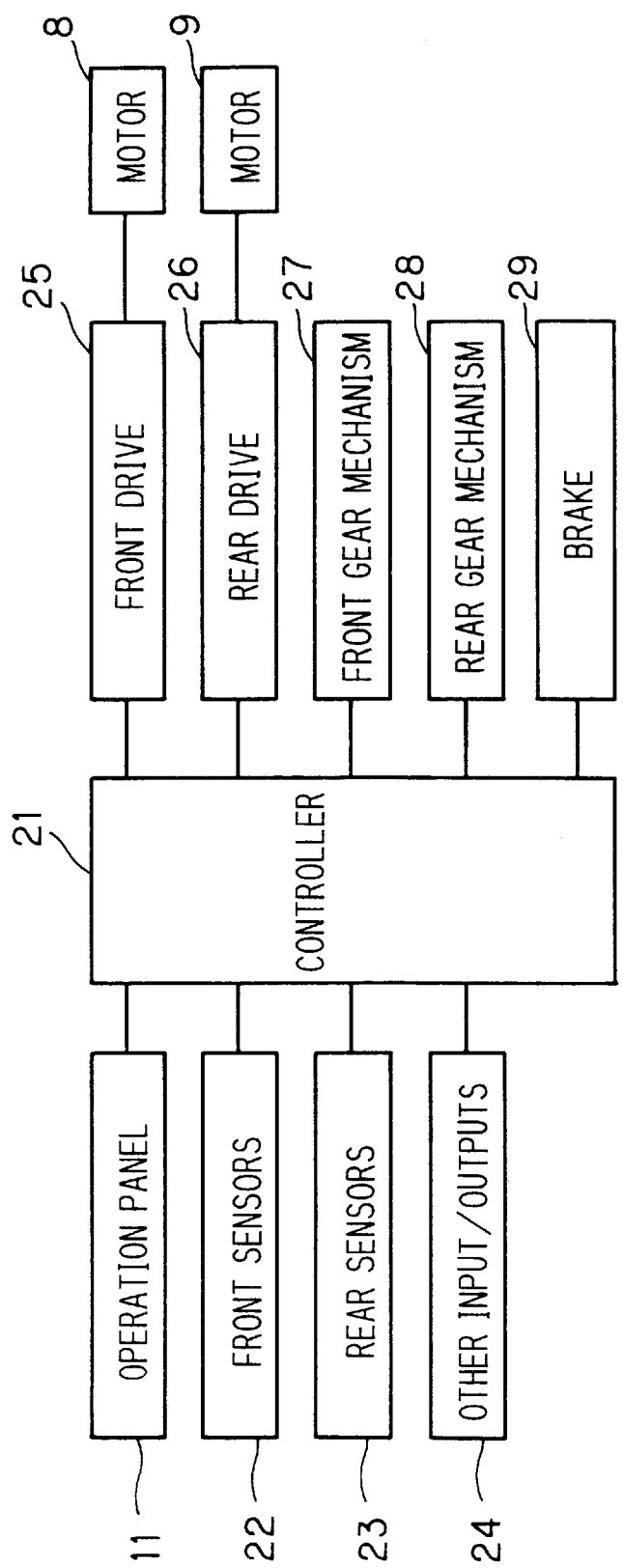
FIG. 4 is a control block diagram for the vehicle depicted in FIG. 1.

As shown in FIG. 4, the ascending/descending vehicle is provided with a controller 21. The controller 21 includes a microcomputer which includes a CPU, ROM units, RAM units and the like. The controller 21 is connected to an operation panel 11, front sensors 22, rear sensors 23 and other input/output portions 24. The front and rear sensors 22 and 23 detect whether or not each wheel has reached the edge of the step surface, and whether or not each wheel is located on the next step surface. The sensors 22 and 23 may be any of a variety of sensors, for instance, they may be proximity sensors which transmit a signal indicating that the sensor is close to a surface. The sensors 22 and 23 are configured to sense for two surfaces, one surface in a horizontal direction relative to each sensor and one beneath the sensor. For instance, the sensors 22 and 23 can sense the presence or absence of a vertical surface such as a stair riser (or edge of the stair step) and can sense the presence or absence of a horizontal surface below the portion of the vehicle body 1 where the sensor is located.

The controller 21 is connected to a front wheel drive portion 25, which drives the front wheels 6a and 6b by means of a front wheel drive motor 8. The controller 21 is also connected to a rear wheel drive portion 26, which drives the rear wheels 7a and 7b by means of a rear wheel drive motor 9.

The controller may also connected to an optional front gear ratio changing mechanism 27 which selects a gear ratio of the differential gears mounted on the front arm members 4R and 4L, an optional rear gear ratio changing mechanism 28 which selects a gear ratio of the differential gear mounted in the rear arm members 5R and 5L, and a brake 29 for braking the wheels.

Figure 5:
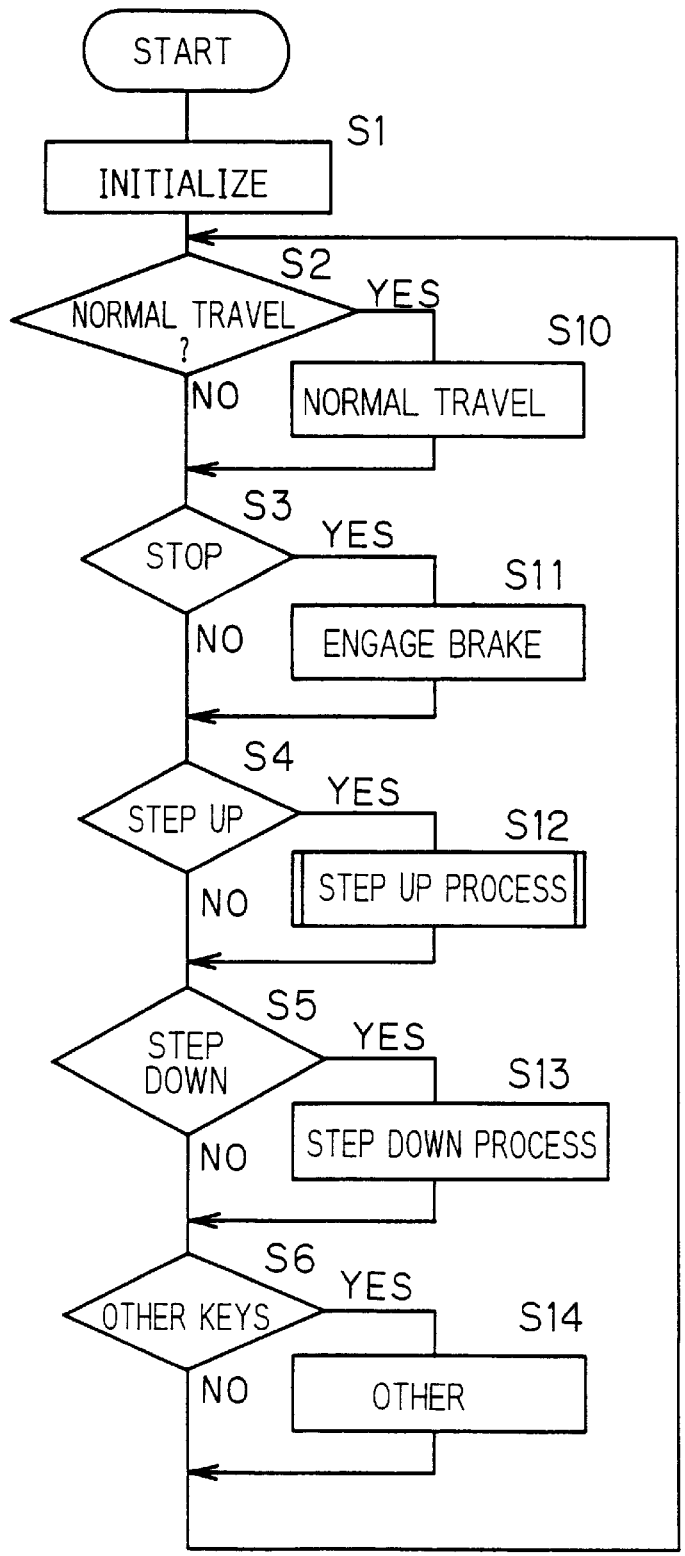
FIG. 5 is a control flowchart for the vehicle depicted in FIG. 1.

The operation of the ascending/descending vehicle will now be described by means of the main flowchart shown in FIG. 5.

When the main switch on the operation panel 11 is turned on, the system is initialized in step S1 to a Normal Travel mode.

In step S2, it is determined whether the Normal Travel mode has been selected by the user. If so, the process moves to step S10, and at least one set of the front and rear wheels 6 and 7 are driven forward or in reverse (depending on user input).

In step S3, it is determined whether the Stop button has been operated. If so, the process moves to step S11, and the brake 29 brakes the wheels. In step S4, it is determined whether the Step Up mode has been selected by the user. If so, the process moves to step S12, and the Step Up process is carried out. In step S5, it is determined whether the Step Down mode has been selected. If so, the process moves to step S13, and the Step Down process is carried out.

In step S6, it is determined whether any other keys have been operated. If so, the process moves to step S14, and the process returns to step S2.

The Step Up process in step S12 will now be described.

When the process is shifted to the Step Up mode (FIG. 5, step S12) the controller 21 engages the Step Up mode shown in FIG. 6, starting at step S21. In step 21, a detecting time T defined in a RAM register within the controller 21 is reset. The detecting time T corresponds to the predetermined height of steps in a stairway and may be preset or may optionally be re-determined each time the vehicle body 1 traverses a new or different set of stairs. In step S22, at least one of the front wheel drive portion 25 and the rear wheel drive portion 26 is engaged for forward travel so that the vehicle body 1 can advance forward. In step S23, signals from the front sensor 22 are monitored. A counting operation is started for determining the height of steps by measuring a corresponding detecting time t which measures the amount of time it takes for a signal change from a corresponding one of the sensors 22 or 23 to pass the top of a stair. For instance, as the vehicle body 1 moves upward with respect to a stair step, the time taken to climb that single step is monitored by the corresponding sensors 22 or 23 or both, until the corresponding sensor detects the next step surface. In step S23, it is determined whether or not the front sensors 22 has sensed an edge of a step, for instance the edge E1 shown in FIG. 7A. If the front wheel 6a has reached the edge of the step surface of the stairs and the front sensor 22 produces a signal representing reaching the edge of the step surface, the process is shifted to step S24. In step S24, it is judged whether or not the Step Up mode is to be the Crawling-Up mode.

In this case, if a predetermined button is operated on the operation panel 11 and the Crawling-Up mode is assigned, or if it is determined by the sensors or feedback from sensors in the motors 8 and 9 or the like whether a frictional constant of the step surfaces of the stairs exceeds a predetermined level, then it is confirmed that the Crawling mode is selected and the process is shifted to step S25. It should be noted that the vehicle body 1 may be fitted with arm members that have a fixed gear ratios which predetermine that the Crawling mode must always be used.

In step S25, the gear arrangement may be changed by the front gear ratio changing mechanism 27 (if the vehicle body 1 is provided with a gear ratio changing mechanism instead of the fixed gear ratio arm members), so that the gear ratio (Z3/Z1) of each differential gear mounted on the front arm members 4R and 4L is properly set. In step S26, the front wheel 6a is raised in the Crawling Mode. In this case, torque force applied to the front wheel 6b causes the wheel 6b to be depressed downwardly with respect to the front arm members 4R and 4L. The front wheel 6a rotates to move upward with respect toward an adjacent step surface, such as the step ST2 in FIG. 7D, while being in contact with the edge E2 of the corresponding step riser. The front wheel 6a moves up on to the next step ST2. Under this condition, the process is further shifted to step S22 to thereby perform the drive by the front drive portion 25 and the rear drive portion 26 to advance the vehicle body 1.

Figure 8A:
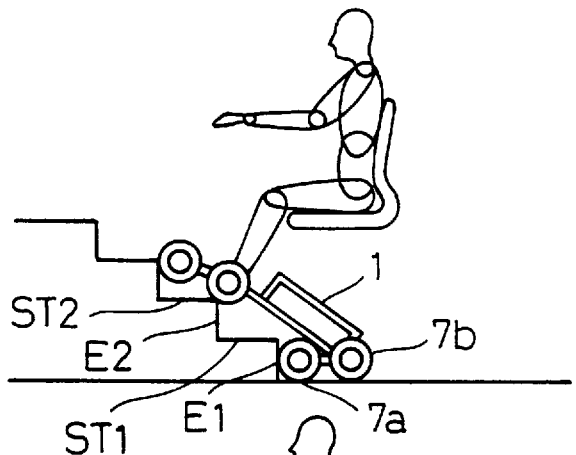
FIGS. 8A to 8C show the vehicle depicted in FIGS. 7A to 7D continuing to ascend a flight of stairs in the crawling mode.

In step S23, if it is determined that the front sensor 22 has not sensed a step, the process is shifted to step S27. In step S27, it is determined whether or not one of the rear sensors 23 has sent a signal indicating that there is a step. If the rear wheel 7a has reached the edge E1 of the step surface ST1, as shown in FIG. 8A, the process is shifted to step S28. In step S28, it is judged whether or not the ascending mode is the Crawling mode. In this case, if a predetermined button is operated on the operation panel 11 and the Crawling mode is assigned, or if it is judged by one of the sensors or feedback from the motors 8 and 9 whether a frictional constant of the step surfaces of the stairs exceeds a predetermined level, or if the arm members are provided with a fixed gear ratio that determines the Crawling mode is always engaged, it is confirmed that the Crawling mode is selected and the process is shifted to step S29.

Figure 8B:
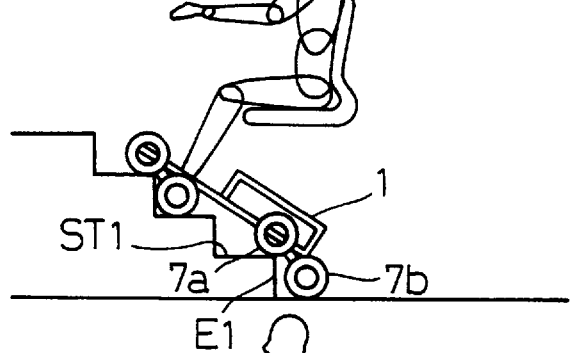

In step S29, the gear arrangement is selected by the gear ratio changing mechanism 28 so that the gear ratio (Z3/Z1) of each differential gear mounted on the rear arm members 5R and 5L exceeds one, providing the optional gear ratio changing mechanism are employed in each of the arm members. In step S30, the rear wheel 7a is raised in the Crawling mode. In this case, torque force applied to the rear wheel 7b causes the wheel 7b to be pressed downwardly with respect to the rear arm members 5R and 5L. Consequently, the rear wheel 7a move up toward the step ST1 while contacting the edge E1 of the step surface ST1. Subsequently, the rear wheel 7a moves up to the next step surface ST1, as shown in FIG. 8B. In step S31, the height of steps detecting time t is reset. Under this condition, the process is further shifted to step S22 to thereby perform the drive by the front drive portion 25 and the rear drive portion 26 to advance the vehicle body 1.

In step S24, if a predetermined button on the operation panel 11 is operated to thereby assign the Rotational mode, or if it is judged by one of the sensors or the like that the frictional constant of the step surfaces of the stairs is lower than a predetermined value or if the arm members have been provided with fixed gear ratios which cause a continuous usage of the Rotational mode, the ascending mode is determined to be the Rotational mode, then the process is shifted to step S32. In step S32, the gear arrangement is selected by the gear ratio changing mechanism 27 so that the gear ratio (Z3/Z1) of each differential gear mounted on the front arm members 4R and 4L is smaller than one (providing the arm members employ the optional gear ratio changing mechanism). In step S33, the front wheels 6b and 6b rise in response to torque force in the Rotational mode. In this case, the torque force applied to the front arm members 4R and 4L cause the front wheel 6b is lifted upwardly. The front wheels 6a and 6b are rotated about the shaft 2 together with the front arm members 4R and 4L to travel on the next step, as is shown in FIGS. 9A, 9B, 9C and 9D. Thereafter, the process is shifted to step S22.

In step S28, if a predetermined button on the operation panel 11 is operated to thereby assign the Rotational mode, or if it is judged by the sensor or the like that the frictional constant of the step surfaces of the stairs is smaller than a predetermined value, the selected ascending mode is judged to be the Rotational mode, then the process is shifted to step S34. In step S34, the gear arrangement is selected by the gear ratio changing mechanism 28 so that the gear ratio (Z3/Z1) of each differential gear mounted on the rear arm members 5R and 5L is smaller than one (if the optional gear ratio changing mechanism is employed). In step S35, the rear wheels 7a and 7b are raised in the Rotational mode. In this case, torque force applied to the rear arm members 5R and 5L causes the rear wheel 7b is lifted upwardly. The rear wheels 7b and 7b rotate together with the rear arm members 5L and 5R about the shaft 3 to travel on the next step surface, as is shown in FIGS. 10A, 10B, 10C and 10D. In step S36, the height of steps detecting time t is reset. Thereafter, the process is shifted to step S22.

In step S27, if it is judged that the front sensor 22 for the rear wheel 7a is not turned on, the process is shifted to the step S37. In step S37, it is judged whether or not the step detecting time t exceeds a predetermined time T which is set in advance. If the height of steps detecting time t is equal to or less than the predetermined time T, the process is shifted to step S22. If the step detecting time t is longer than the predetermined time T, the process is shifted to step S38. In step S38, the normal travel mode is selected and the process is returned back to the main routine shown in FIG. 5.

Figure 7A:
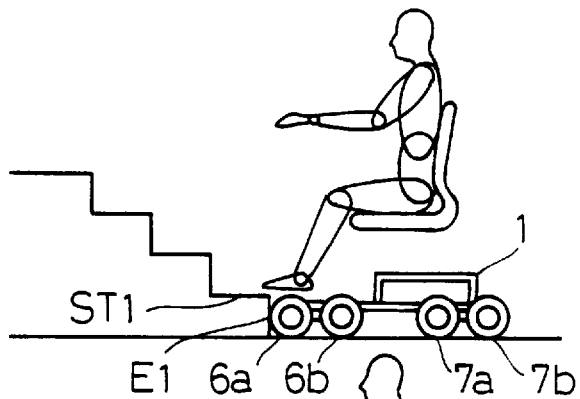
FIGS. 7A to 7D show the vehicle depicted in FIG. 1 ascending a flight of stairs in a crawling mode.
Figure 7B:
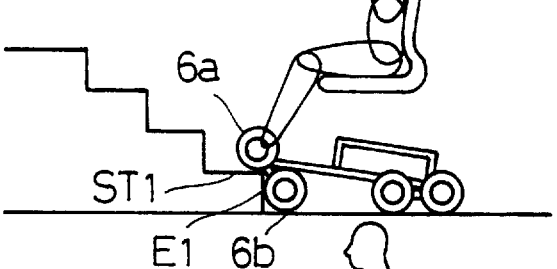
Figure 7C:
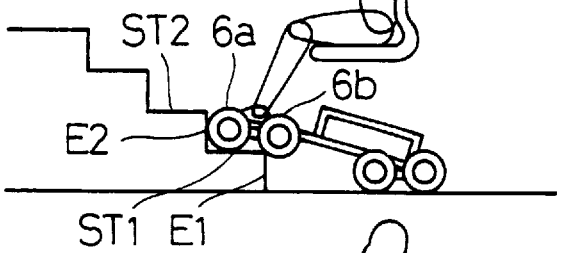
Figure 7D:
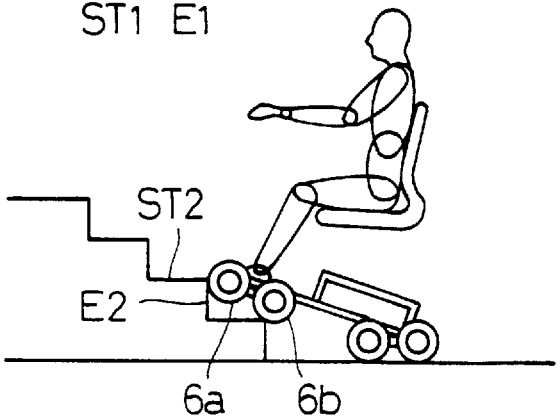

In the Crawling mode, as shown in FIG. 7A, if the front wheel 6a reaches the edge E1 of the step surface ST1 and the front sensor 22 sends a corresponding signal, the predetermined gear ratio is selected. The front wheel 6a is rotatingly moved on the edge E1 and reaches the step ST1 as shown in FIG. 7B. Furthermore, the vehicle body 1 is advanced, so that, as shown in FIG. 7C, the front wheel 6a reaches the edge E1 of the next step surface. As shown in FIG. 7D, the front wheel 6a is rotatingly moved on an edge E2 and is moved to the next step ST2.

Figure 8C:
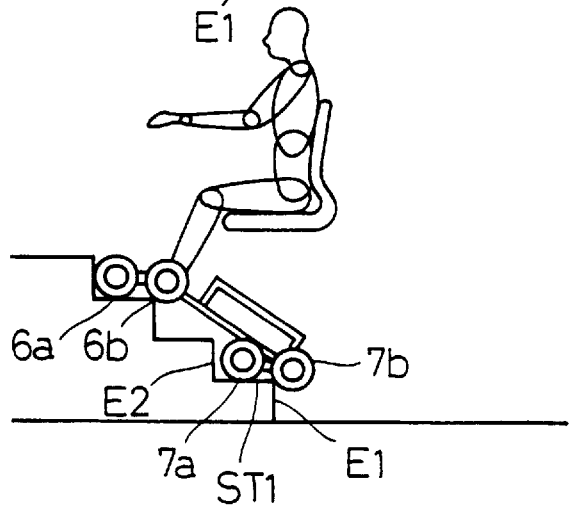

As shown in FIG. 8A, when the rear wheel 7a reaches the edge E1, the gear ratio of each differential gear mounted on the rear arm members 5R and 5L is selected so that the rear wheel 7a is rotatingly moved on the edge E1. Thus, as shown in FIG. 8B, the rear wheel 7a is moved to the step ST1. Furthermore, as shown in FIG. 8C, the vehicle is advanced, and the foregoing operation is repeated so that the vehicle may ascend the stairway.

Further, in the Rotational mode, as shown in FIG. 9A, when the front wheels 6a reach the edge E1, the gear ratio is selected so that the rotational force is applied to the front arm members 4R and 4L. Thus, as shown in FIG. 9B, the front wheels 6b are rotated together with the front arm members 4R and 4L. As shown in FIG. 9C, the front wheels 6b are located on the step surface ST1. Under this condition, the vehicle is advanced, and when the front wheels 6b reach the edge E2 as shown in FIG. 9D, the gear ratio on the front wheel 6a side may be changed so that, in the same way, the front arm members 4R and 4L and the front wheels 6a are rotated together.

Figure 10A:
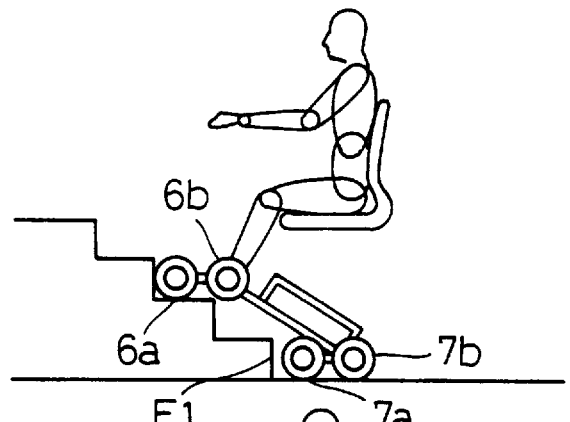
FIGS. 10A to 10C show the vehicle depicted in FIGS. 9A to 9D continuing to ascend a flight of stairs in the rotational mode.
Figure 10B:
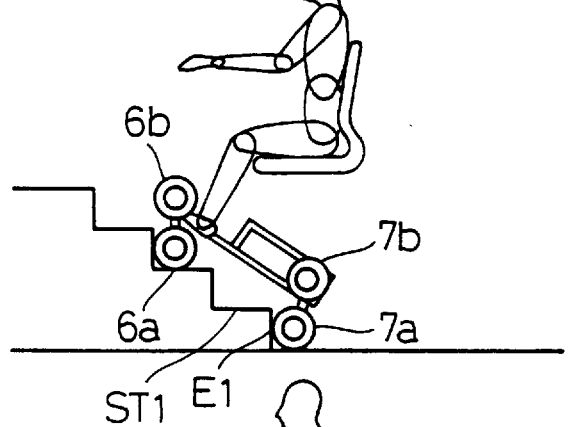
Figure 10C:
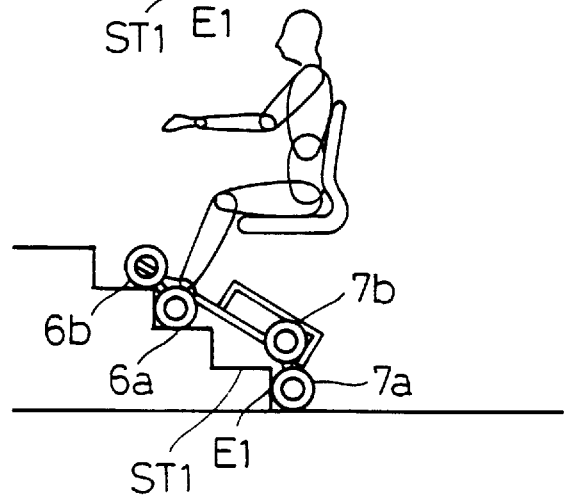

If the rear wheels 7a reach the edge E1 as shown in FIG. 10A, the gear ratio of each differential gear mounted on the rear arm members 5R and 5L is selected, so that the rotational force is applied to the rear arm members 5R and 5L. Thus, as shown in Figs. 10B and 10C, the rear wheels 7b are rotated together with the rear arm members 5R and 5L, and are moved to the next step surface ST1. The foregoing operation is repeated so that the vehicle may climb up the stairway.

With such an arrangement, the vehicle may ride over the stairway upwardly without any damage of the corner portions of the step surface of the stairway. Also, if the Crawling mode is selected for ascending, it is possible for the vehicle to readily ascend a flight of stairs having steps higher than the diameter of the wheels. It is possible to suppress the vertical vibrations of the vehicle body. The vehicle may ascend the stairway in a stable manner.

Also, it is possible for the vehicle to ascend the stairway in a positive manner in the rotational mode even if the frictional constant of the step surfaces of the stairs is small and the step surfaces are slippery.

In accordance with the present invention, there are at least three possible configurations of the present invention possible. In a first configuration, the gear ratio Z3/Z1 of the first gear 12 to the third gears 14a and 14b is fixed to be greater than 1. As described above, this causes the arm members 4L, 4R, 5L and 5R to climb stairs in the Crawling mode, shown in FIGS. 7A, 7B, 7C, 7D, 8A, 8B, 8C and 8D. In a second configuration, the gear ratio Z3/Z1 of the first gear 12 to the third gears 14a and 14b is fixed to be less than 1. As described above, this causes the arm members 4L, 4R, 5L and 5R to climb stairs in the Rotational mode, shown in FIGS. 9A, 9B, 9C, 9D, 10A, 10B, 10C and 10D. In a third configuration, the arm members 4L, 4R, 5L and 5R may be provided with an optional gear ratio changing mechanism which makes it possible to vary the ratio Z3/Z1 to be either greater than 1 or less than 1 depending upon the desired usage of the present invention.

The various configurations of the present invention each have their own advantages. For instance, with the gear ratio Z3/Z1 being greater than 1 and the present invention climbing stairs in the Crawling mode, the ride is likely to be smooth and somewhat quicker than in the Rotational mode. However, if the friction constant of the stair surface is such that the wheels of the vehicle body 1 might slip, the Crawling mode may not be safe to employ. Therefore, if the friction constant of the stair surfaces is low, the Rotational mode should be used and the gear ratio Z3/Z1 should be less than 1 to cause the arm members to rotate about the main shafts upon stair engagement.

In a modification of the foregoing embodiment, it is possible to change an angle between the vehicle body and the seat in order to keep the seat in a horizontal condition when the vehicle ascends/descends.

In the stairway ascending/descending vehicle according to the present invention, since the two wheels mounted on an each arm member and the main shaft are connected to each other by a drive force transmission means, and the arm member is supported rotatably, the drive force transmission ratio is selected by the speed changing means so that the vehicle may select the Crawling mode in which the vehicle crawls the vertical surface of the stairway.

Accordingly, the vehicle may readily ascend the stairway having the height of steps higher than the diameter of the wheels. The up-and-down movement of the vehicle body is suppressed during the upward travel along and on the stairs in a stable manner.

Also, even under the condition that the frictional constant of the step surface of the stairs is small and the stairway is slippery, it is possible for the vehicle to ascend the stairway in the rotational mode.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A method for controlling a vehicle ascending and descending a flight of stairs, comprising the steps of:

controlling rotation of a plurality of wheels, two of the wheels being attached to an elongated arm member, the arm member being supported on a rotatable shaft which is in turn supported on a vehicle body having a plurality of the rotatable shafts supported thereon, the arm member being rotatable with respect to the rotatable shaft and the wheels being rotatable with respect to the arm member, and torque transmitting members being employed within the arm member for transmitting torque to the wheels;

sensing proximity to a step of a stairway from sensors installed on the vehicle body;

determining one of two modes for ascending the stairs in response to signals from the sensors and configuration of the arm members, wherein a first of the two modes being a crawling mode where the arm member pivots about the main shaft as the vehicle body climbs the stairs without the arm member completely rotating and a second of the two modes being a rational mode where the arm member rotates completely about the main shaft as the vehicle body climbs the stairs;

engaging the stairs in the determined mode; and sensing proximity to another step of the stairway.

2. A stairway climbing vehicle comprising:

a vehicle body;

front and rear main shafts rotatably supported on a front portion and a rear portion of said vehicle body, respectively;

front and rear arm members rotatably supported on right and left side portions of the main shafts, respectively, each of said front and rear arm members configured to rotate relative to a corresponding one of said main shafts;

each of said front and rear arm members including two wheels rotatably mounted on opposite ends of said arm members, each of said front and rear arm members further including torque transmitting members for transmitting torque from said main shafts to said wheels, each of said torque transmitting members include a plurality of gears mechanically connecting said main shafts and said wheels within a corresponding one of said arm members;

torque generating means for powering said main shafts; and wherein said torque transmitting members includes
a first gear fixed to said corresponding one of said main shafts within a corresponding one of said arm members;
a pair of gear ratio changing mechanisms disposed on opposing lateral sides of said first gear within said arm member, each of said gear ratio changing mechanisms engaged with said first gear;
a pair of third gears, each of said third gears disposed within said arm member and attached to a corresponding one of said wheels, each of said third gears engaged with a corresponding one of said gear ration changing mechanisms; and
said gear ration changing mechanisms being configured selectively change a gear ratio between said first gear and said third gears.

3. The stairway climbing vehicle according to claim 2, wherein said gear ratio changing mechanisms are configured to set said gear ratio between said first gear and said third gears such that in response to one of said wheels engaging a vertical surface said corresponding one of said arm members rotates in a direction opposite to the rotational direction of said main shafts.

4. The stairway climbing vehicle according to claim 2, wherein said gear ratio changing mechanisms are configured to set said gear ratio between said first gear and said third gears such that in response to one of said wheels engaging a vertical surface said corresponding one of said arm members rotates in a direction corresponding to the rational direction of said main shafts.

* * * * *